(12) United States Patent
Atkinson et al.

(10) Patent No.: US 6,997,842 B2
(45) Date of Patent: Feb. 14, 2006

(54) DIFFERENTIAL ASSEMBLY AND METHOD OF ASSEMBLY

(76) Inventors: Aaron W. J. Atkinson, 333 E. 11 Mile Rd.Apt. 25, Royal Oak, MI (US) 48067; Douglas D. Miller, 1251 Elliott Ave., Madison Heights, MI (US) 48071

(*) Notice: Subject to any disclaimer, the term of this patent is extended or adjusted under 35 U.S.C. 154(b) by 0 days.

(21) Appl. No.: 10/648,988

(22) Filed: Aug. 27, 2003

(65) Prior Publication Data

US 2005/0049104 A1    Mar. 3, 2005

(51) Int. Cl.
*F16H 48/20*    (2006.01)
*F16F 9/00*    (2006.01)

(52) U.S. Cl. .......................... 475/235; 267/69; 267/182
(58) Field of Classification Search ................ 475/230, 475/234, 235; 267/182, 69, 70, 73; 188/73.38
See application file for complete search history.

(56) References Cited

U.S. PATENT DOCUMENTS

| | | | |
|---|---|---|---|
| 2,234,592 A * | 3/1941 | Fitzner | 475/235 |
| 3,208,306 A | 9/1965 | Lewis | |
| 3,327,560 A * | 6/1967 | Holdeman | 475/235 |
| 3,477,312 A | 11/1969 | Duer | |
| 3,527,120 A | 9/1970 | Duer et al. | |
| 3,624,717 A | 11/1971 | Brubaker | |
| 3,853,022 A | 12/1974 | Duer | |
| 3,874,250 A | 4/1975 | Duer | |
| 3,896,684 A | 7/1975 | Duer | |
| 3,930,424 A | 1/1976 | Myers, Sr. | |
| 5,055,095 A | 10/1991 | Osenbaugh et al. | |
| 5,183,446 A | 2/1993 | Hughes | |
| 5,226,861 A * | 7/1993 | Engle | 475/235 X |
| 5,507,702 A | 4/1996 | Joachim et al. | |
| 5,741,199 A | 4/1998 | Tanser et al. | |
| 6,015,362 A | 1/2000 | Irikura et al. | |

FOREIGN PATENT DOCUMENTS

FR    2547883    * 12/1984   ................. 475/235

* cited by examiner

*Primary Examiner*—Ha Ho

(57) ABSTRACT

A method of assembling a differential assembly and a biasing element for a differential wherein the biasing element may be added or removed from an assembled differential without having to remove the pinion shaft. The biasing element is generally a W-spring that includes a center opening and open sides that face the same direction to facilitate the addition or removal of the biasing element.

10 Claims, 5 Drawing Sheets

DIFFERENTIAL ASSEMBLY AND METHOD OF ASSEMBLY

BACKGROUND OF THE INVENTION

The present invention relates to a differential assembly and, more particularly, to a biasing element for a limited slip differential.

Differential assemblies including limited slip differentials are generally well known in the art. In a limited slip differential, a differential case encloses and locates side gears and pinions. The side gears are in rotational engagement with the pinions which rotate about a pinion shaft. A clutch pack disposed between the side gears and differential case is generally urged into frictional engagement by a biasing element, typically a spring, between the side gears. The biasing element is generally assembled onto the pinion shaft with a passage through which the pinion shaft passes. To assemble the differential assembly, the clutch pack, side gears, pinion gears and pinion thrust washers are placed in the differential case. The biasing element is then installed. The pinion shaft is then passed through the passage on the biasing element so that the biasing element is permanently retained on the pinion shaft. The pinion shaft is then coupled to the differential case with a differential pin bolt.

The above method of assembly is time consuming and, if it is desirable to change the biasing force applied by the biasing element to the side gears, the differential must be disassembled to remove and replace the biasing element. Specifically, the pinion shaft must be removed from the differential case, along with the axle shafts if working with an axle assembly Additionally, as all-wheel-drive vehicles with disconnects at the wheel ends become more popular, it is desirable to provide a limited slip differential with an initial torque bias less than typically found in a limited slip differential. A reduced-bias-force limited slip differential biases the output shafts of a selectively engageable axle to rotate in unison when the wheels are disengaged so that noise, vibration, and harshness issues are reduced while the axle is engaged. Currently, these reduced-bias-force limited slip differentials must be specially assembled by adding the biasing element before the axle shafts are installed and the pinion shaft is coupled to the differential case during assembly of the axle, or partially disassembling the differential and removing the axle shafts so that the biasing element can be added to the differential.

SUMMARY OF THE INVENTION

The present invention is directed to a method of assembling a differential as well as a biasing element for a differential. The present invention allows the addition or change of a biasing element to an assembled differential without having to disassemble the differential, more particularly, remove the pinion shaft.

The method generally includes rotatably coupling a pair of pinion gears to a pinion shaft, coupling the pinion shaft and pinion gears to a differential case, and coupling a biasing element to the pinion shaft after the pinion shaft has been coupled to said differential case. To couple the biasing element to the pinion shaft, a center opening is aligned with said pinion shaft and the biasing element is displaced toward the pinion shaft so that said pinion shaft is disposed in the center opening. The biasing element may further include detents so that the biasing element is retained on the pinion shaft by displacing the biasing element until the pinion shaft is retained within the detents.

The biasing element may be added to almost any differential by aligning a center opening on the biasing element with the pinion shaft, and displacing the biasing element toward the pinion shaft so that the pinion shaft is disposed within the center opening.

The biasing element generally includes a center section defining a center opening and a pair of legs disposed on each side of the center section. Each of the legs defines a cavity having an open side that faces the same direction as the center section. The biasing element may further including an insertion side and the center opening may include an insertion opening. The open sides and the insertion opening are located on the insertion side. The center section defines a base and a pair of side walls extending from said base. Each of the side walls may include engagement detents to retain the biasing element on the pinion shaft.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 2:
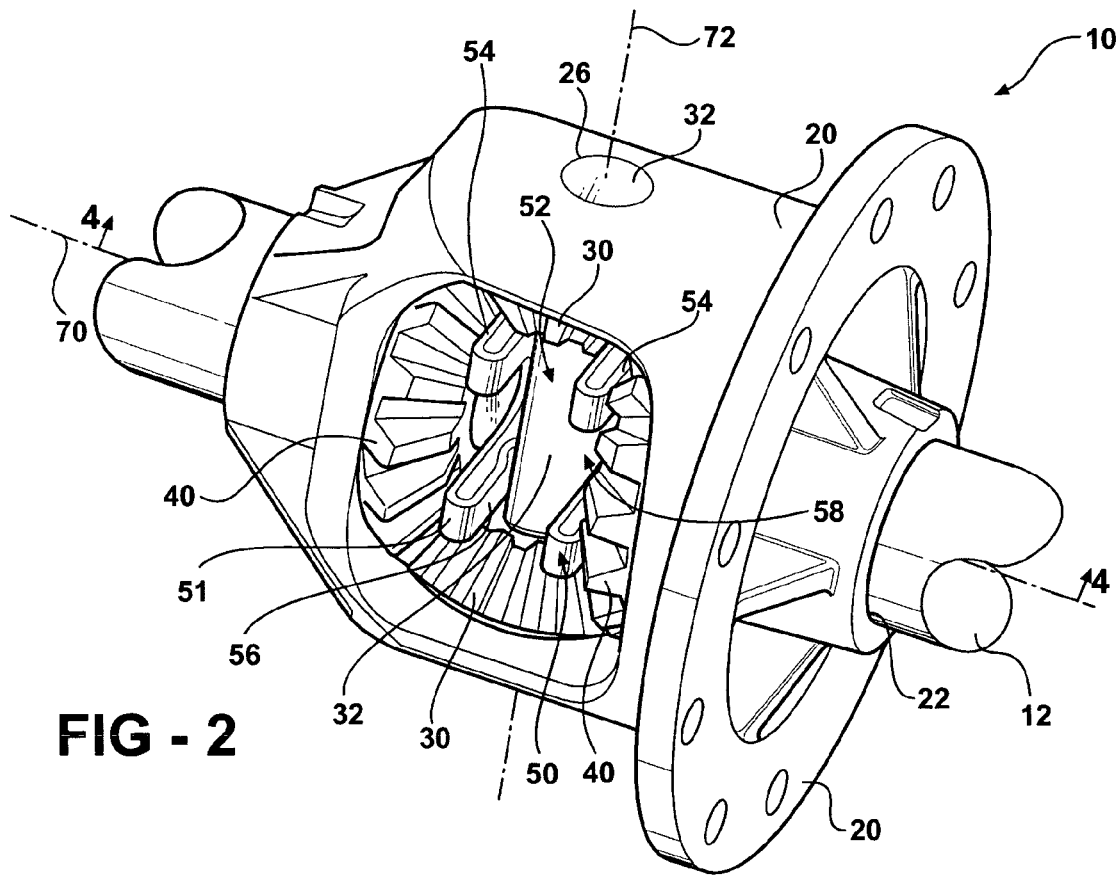
FIG. 2 is a front perspective view of the differential assembly.
Figure 3:
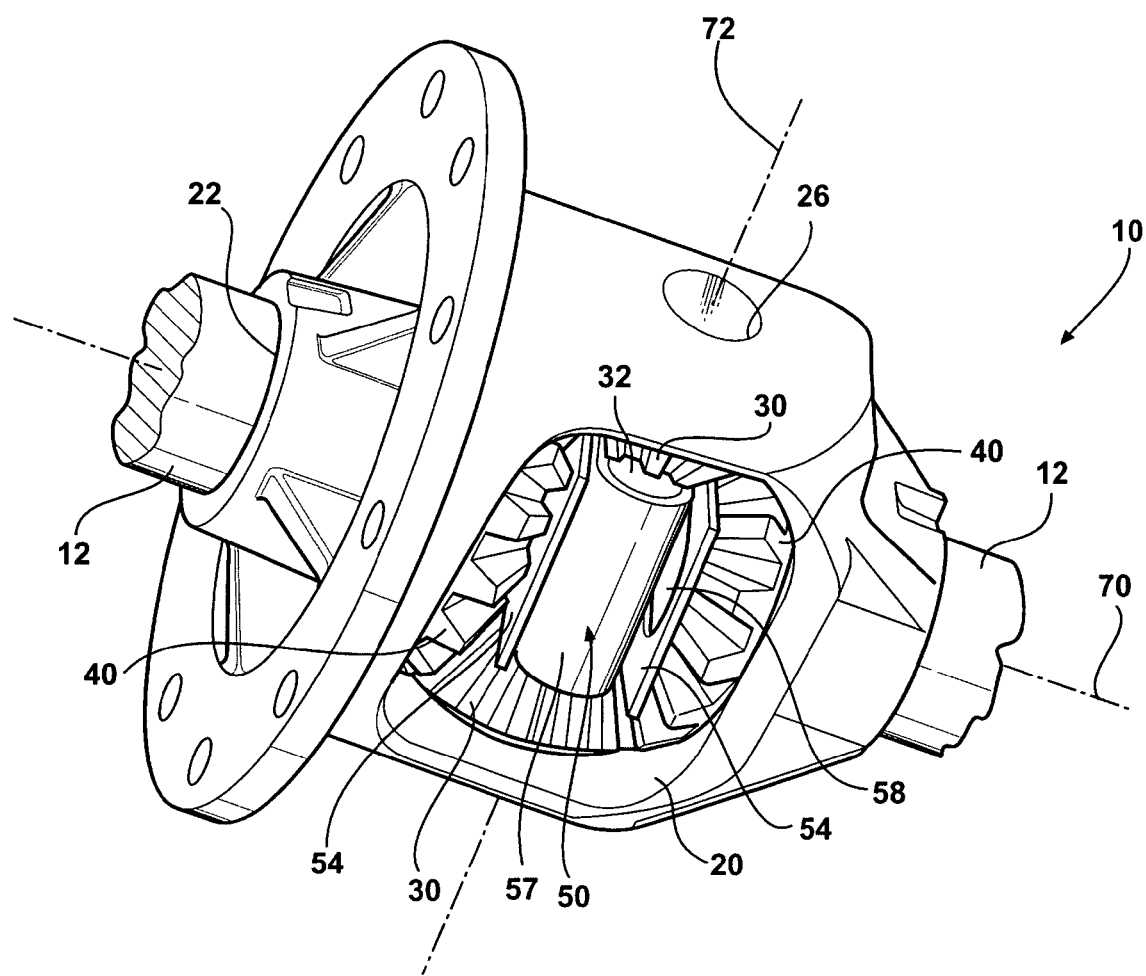
FIG. 3 is a rear perspective view of the differential assembly.

A differential assembly 10 constructed in accordance with the illustrated embodiment is shown in FIGS. 2 and 3. The differential assembly 10 receives an input torque from a ring gear (not shown) and transfers torque to output shafts 12. More specifically, a differential case 20 is rotated about an axis 70 and locates the pinion shaft 32, pinions 30, and side gears 40 within the differential assembly 10. A clutch pack 80 and a biasing element 50 create an initial torque bias to inhibit the rotation of the side gears 40 relative to each other so that the side gears generally rotate in unison until the initial torque bias is overcome. The biasing element 50 is configured to be inserted onto the pinion shaft 32 at any time, including after installation of the output shafts 12 and complete assembly of the differential, even to preassembled differentials to create a torque bias.

The differential case 20 is similar to most differential cases. The differential case 20 includes axial openings 22 through which the side gears 40 pass so that they may be connected to the output shafts 12. The differential case 20 also includes a support surface 24 against which a thrust washer 82 or clutch pack 80 is assembled.

Figure 4:
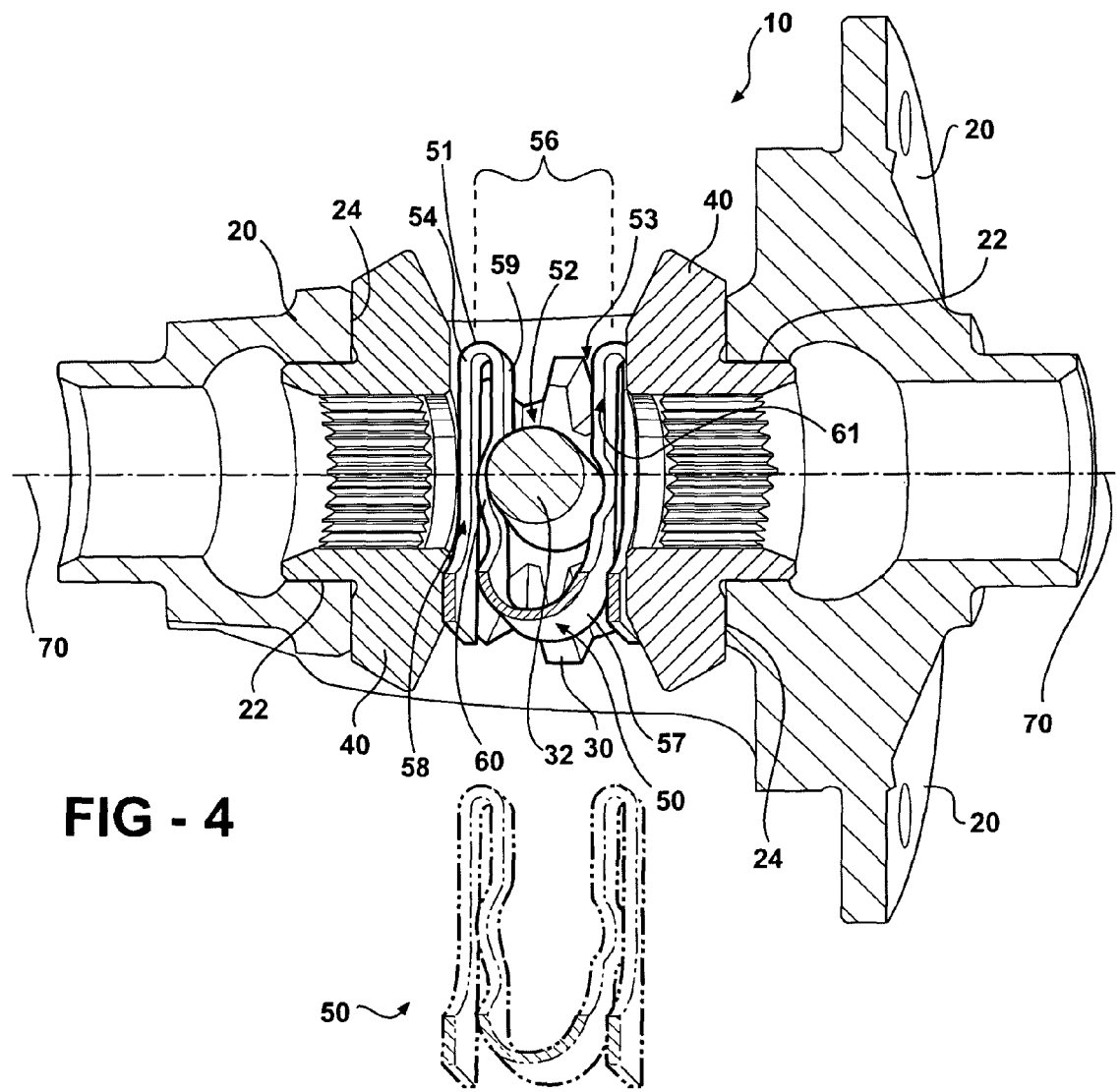
FIG. 4 is a sectional view of the differential assembly along lines 4—4 in FIG. 2.
Figure 5:
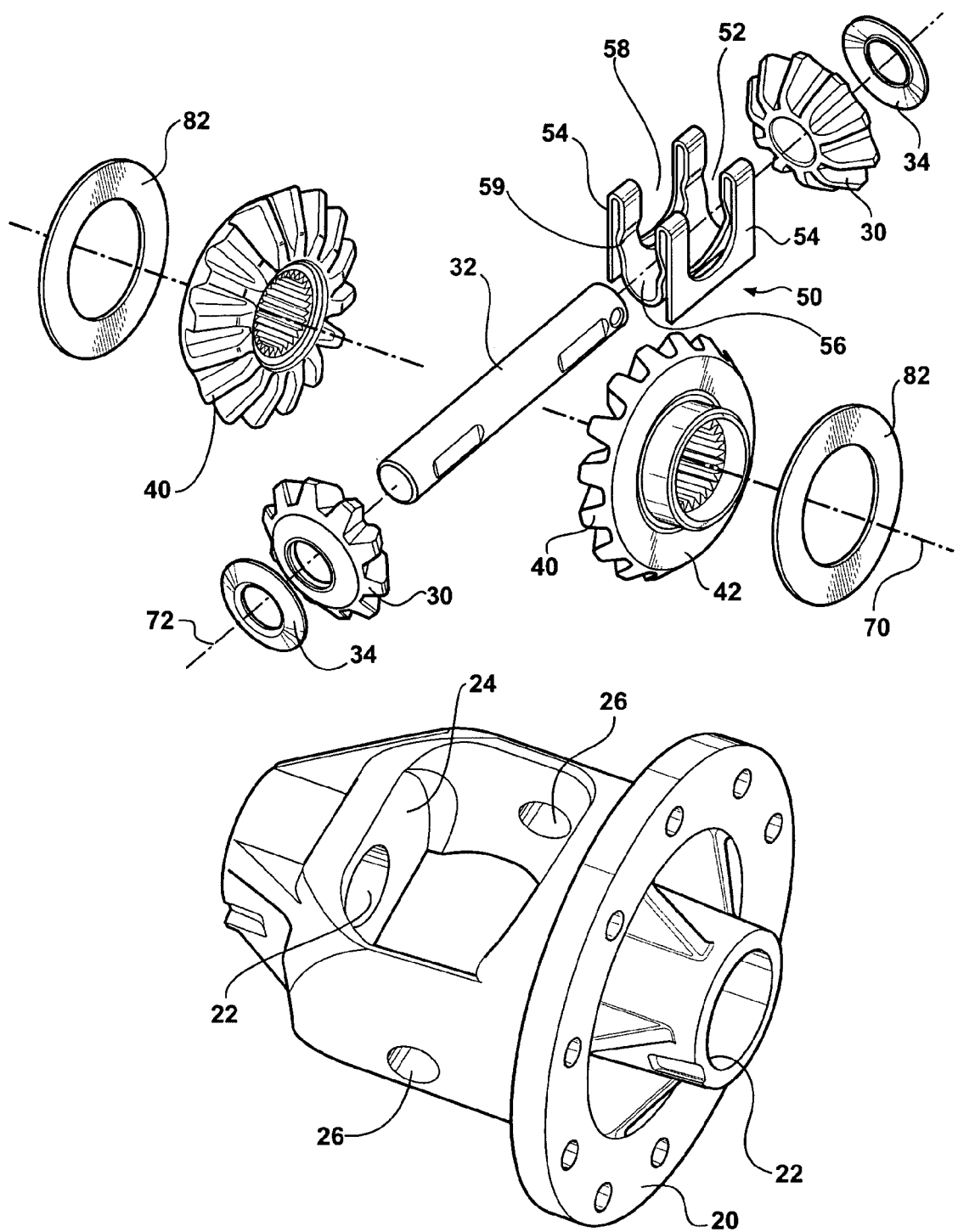
FIG. 5 is an exploded perspective view of the differential assembly.

The side gears 40 and pinions 30 are similar to those found in most differentials and may vary in size and shape depending upon the desired application. The differential assembly 10 is illustrated as having two pinions 30, although the configuration may vary so that more pinions may be used. The pinions 30 mesh with or engage the side gears 40 coupled to the output shafts 12 so that as wheel speeds differ between opposing wheels (not shown), such as when a vehicle turns a corner, the pinions rotate about the pinion shaft 32, allowing the side gears to rotate relative to each other. More specifically, the side gears 40 rotate about an axis 70 while the pinions 30 rotate about the pinion axis 72. As illustrated in FIGS. 4 and 5, a pinion thrust washer 34 prevents the pinions from frictionally engaging the differential case 20. The pinions 30 and side gears 40 are preferably, though not necessarily, formed out of steel and forged.

Figure 6:
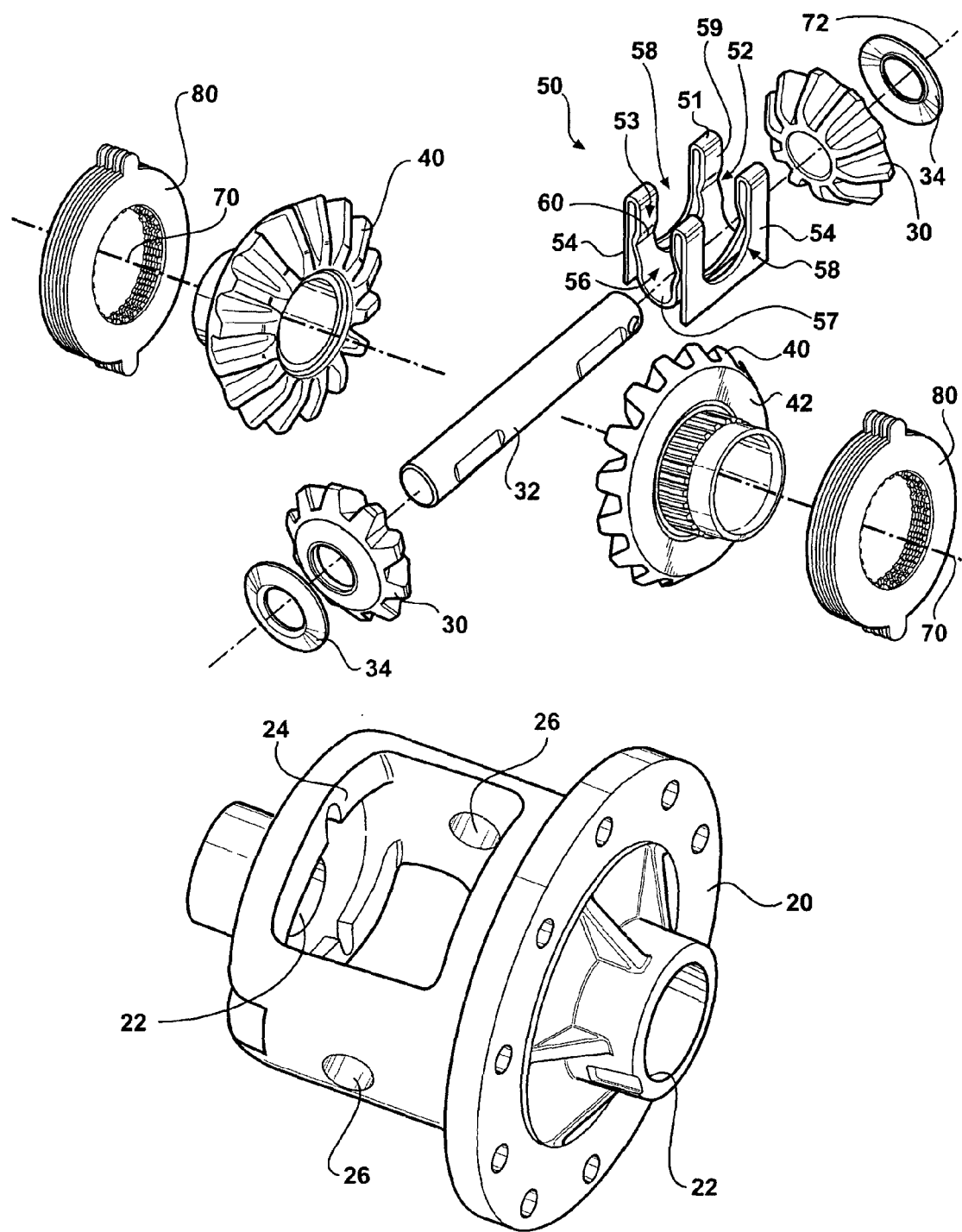
FIG. 6 is an exploded perspective view of an alternative embodiment of the differential assembly including a clutch pack.

The side gears 40 may be attached to the output shafts 12 by a variety of methods known in the art, such as the spline connection illustrated in FIG. 4. The side gears 40 include a pressure surface 42 (FIGS. 5 and 6) which is engaged against the clutch pack 80 or thrust washer 82, so that the thrust washer or clutch pack is retained between the differential case 20 and side gears.

The biasing element 50 creates an initial torque bias to inhibit rotation of the side gears 40 so that the side gears generally rotate in unison until the initial torque bias is overcome. Accordingly, by initially restraining the side gears against relative rotation, the biasing element 50 prevents relative rotation of the output shafts 12. The initial torque bias is caused by the biasing element 50 urging the side gears 40 against the clutch pack 80 (FIG. 6) or thrust washer 82 (FIG. 5), supported by the support surface 24 on the differential case 20. The biasing element 50 is typically placed between the side gears 40 so that the side gears are forced outwardly toward the differential case 20.

Figure 1:
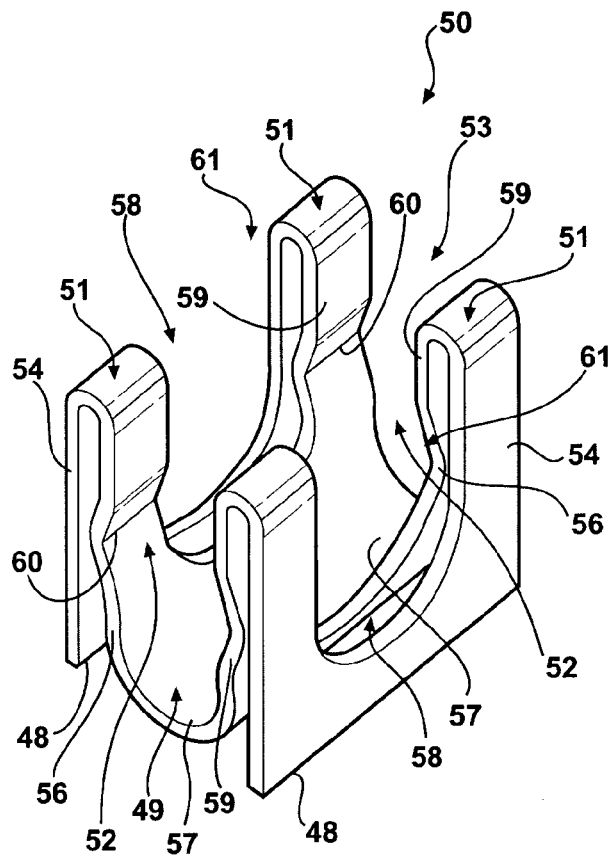
FIG. 1 is a perspective view of the biasing element.

The biasing element 50 is generally a W-shaped spring having a generally "U" or "V" shaped center section 56 and legs 54 extending from the center section. The center section 56 defines a center opening 52 and includes a base 57 and sidewalls 59 extending between the base and legs 54. The biasing element 50 further includes an insertion side 51 where the legs 54 are connected to the sidewalls 59. The insertion side 51 defines an insertion opening 53 of the center opening 52. As described in greater detail below, the center opening 52 further includes pinion shaft openings 49, allowing the pinion shaft 32 to extend through the center opening after being inserted through the insertion opening 53. The legs 54 define aligned cavities 58, as illustrated in FIG. 1, facing the same direction as the center opening 52. The insertion side 51 defines the open ends of both the center opening 52, illustrated as the insertion opening 53 in FIG. 1, and the cavities 58, illustrated as the open side 61. More specifically, the insertion side 51 defines the open sides 61 of the cavities 58 as well as the insertion opening 53 of the center opening 52, so that the center opening and cavities face with their open sides in the same direction to the insertion side. As illustrated in FIG. 1, the legs 54 and sidewalls 59 of the center section 56 may both define the cavities 58. Of course, it should be readily recognized that the cavities 58 defined by the legs 54 may extend from the insertion side 51 to the leg ends 48, therefore creating a slot shaped cavity (not shown). The cavities 58 provide clearance for the output shafts 12. In some embodiments, the output shafts 12 may be retained by the legs 54 clipping to the output shafts 12. The sidewalls 59 may further define detents 60 that help locate and couple the pinion shaft 32 to the biasing element 50. The detents 60 may be formed in a variety of configurations so long as they locate the position of the pinion shaft 32 within the center opening 52. In the illustrated embodiment, the detents 60 are opposing arcuate segments defined by the sidewalls 59, into which the rounded pinion shaft 32 rests, but any other configuration may be used, such as welded bumps between which the pinion shaft could rest. The detents 60 also retain the pinion shaft 32 within the center opening 52, thereby preventing the biasing element 50 from becoming disengaged from the pinion shaft 32.

The legs 54 extend from the center section 56 generally along and somewhat away from the center section. The legs 54 engage the side gears 40 to urge the side gears against the clutch pack 80 or thrust washer 82. Therefore, as the biasing element 50 is disposed toward the pinion shaft 32, the legs 54 are compressed toward the center section 56. This compression generally forces the side gears outwardly, creating the initial torque bias.

The method will now be described in greater detail. The configuration of the biasing element 50 allows the differential assembly 10 to be assembled before the biasing element is added, or an assembled differential to be purchased and then the biasing element added. Of course, one skilled in the art may recognize that the biasing element 50 may be added during assembly of the differential assembly 10. One advantage to the biasing element 50 is its ability to facilitate assembly by being inserted at any time during assembly, or even after the differential has already been assembled. Further, the biasing element 50 may be configured to provide a force to the side gears that is unique to individual vehicles. Therefore, a standard differential may be used wherein the biasing element 50 configures the standard differential to various vehicles by providing the required customized initial torque bias.

The openings face the same direction, specifically the center opening 52 and cavities 58 face the same direction so that as the biasing element is disposed toward the pinion shaft, the openings are aligned with the pinion shaft 32 and output shafts 12. Of course, the biasing element 50 may be added before the output shafts 12 are added, and therefore may be aligned solely with the pinion shaft 32. The biasing element 50 is displaced toward the pinion shaft 32 so that, during displacement, the pinion shaft becomes disposed within the center opening 52. More specifically, as the biasing element 50 is displaced toward the pinion shaft 32, the pinion shaft enters the center opening 52 through the insertion opening 53. As the pinion shaft is disposed farther, the pinion shaft 32 slides along the sidewalls 59 to become engaged by detents 60. The detents 60 locate the biasing element properly on the pinion shaft 32, between the base 57 and insertion opening 53. If the cavities 58 were not originally aligned with the output shafts 12 before the output shafts are inserted, the biasing element 50 while engaged with the detents 60 or the pinion shaft may be further aligned by moving the biasing element 50 along the pinion shaft 32 until the cavities are aligned properly with the side gears 40 and output shafts 12. If the output shafts 12 are inserted before the biasing element 50 is added to the differential, when the biasing element is added, because the center opening 52 and cavities 58 face the same direction, the biasing element will generally be properly aligned by the output shafts 12 being disposed within the cavities 58 as the biasing element is disposed toward the pinion shaft.

As discussed above, to retain the biasing element 50 on the pinion shaft 32 the biasing element is displaced toward the pinion shaft so that the pinion shaft becomes disposed within the center opening 52 between the sidewalls 59. This insertion, after the pinion shaft 32 is retained within the differential case 20 by the pinion holes 26, facilitates assembly of the differential. The biasing element 50 may be added to traditional open differentials as needed to create a reduced-torque-bias limited slip differential for all-wheel-drive vehicles where the side gears 40 are urged into frictional contact with the thrust washer 82. This allows the manufacturer of a standard differential into which the biasing element 50 is added to manufacture a reduced-torque-bias limited slip differential without having to preassemble special differentials, thereby saving manufacturing cost and assembly time. Another advantage of the orientation of the cavities 58, in that they face the same direction as the center opening 52, is that biasing elements having different biasing forces may be interchanged to provide varying amounts of initial torque bias without disassembly of the differential. Further, in limited slip differentials, the initial torque bias may be varied greatly by using different biasing elements with a standard clutch pack, thereby allowing a standard limited slip differential to be configured for various vehicles. Therefore, manufacturing cost, time, and assembly may be saved by assembling a single differential having a standard clutch pack 80 or thrust washer 82 into which a biasing element, having a biasing force configured to each vehicle, is inserted. The biasing element 50 is shown in phantom lines in FIG. 4 aligned with the pinion shaft and ready for insertion.

The biasing element 50 may be coupled to a gear shaft or pinion shaft 30 after the gear assembly or differential assembly 10 is assembled. This saves time, allows easy servicing of the differential, and easy configuration of limited slip differentials to provide differing initial torque biases. The center opening 52 includes an insertion opening 53 that faces the same direction as the cavities 58. The openings facing the same direction allow the biasing element to be aligned with both the pinion shaft as well as the output shafts and inserted into the differential so that the pinion shaft 30 becomes disposed in the center opening.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A biasing element comprising:
    a center section having a length, said center section including a base opposite an insertion opening, said insertion opening extending said length;
    a center opening defined by said center section and including said insertion opening;
    a pair of legs disposed on each side of said center section, each of said legs defining a cavity having an open side and wherein each of said center opening, said insertion opening and said open sides face the same direction and wherein said open sides and said insertion opening are each located on an insertion side.

2. The biasing element of claim 1 wherein said center section further defines a pair of side walls extending from said base, and wherein each of said side walls further include engagement detents.

3. The biasing element of claim 2 wherein said detents are opposing arcuate segments defined by said side walls.

4. The biasing element of claim 2 wherein said center section includes a side opening in each of the side walls, said openings further defining said cavities.

5. The biasing element of claim 1 wherein said center section includes a pair of side walls extending between said base and said legs and wherein said legs and said side walls meet at said insertion side.

6. The biasing element of claim 5 wherein said center opening further includes pinion shaft openings defined by said center section and said side walls, said pinion shaft openings being located adjacent to said insertion opening.

7. The biasing element of claim 5 wherein said legs extend away from said insertion side.

8. The biasing element of claim 1 wherein said legs include leg ends and wherein said leg ends are opposite said insertion side.

9. The biasing element of claim 1 wherein said legs include leg ends and wherein said leg ends are on the same side as said base.

10. The biasing element of claim 1 wherein said insertion opening is capable of receiving a pinion shaft.

* * * * *